United States Patent
Gu

(10) Patent No.: US 9,260,969 B2
(45) Date of Patent: Feb. 16, 2016

(54) RUNNER FOR DIRECT-CONNECTED LOW-SPEED SMALL MIXED FLOW TYPE WATER TURBINE APPLIED IN HYDRODYNAMIC ENERGY-SAVING COOLING TOWER

(75) Inventor: Xingkang Gu, Jiangsu (CN)

(73) Assignees: NANJING XINGFEI COOLING EQUIPMENT CO., LTD. (CN); TANGSHAN INDUSTRY CONCENTRATE ZONE, Nanjing, Jiangsu (CN)

(*) Notice: Subject to any disclaimer, the term of this patent is extended or adjusted under 35 U.S.C. 154(b) by 1115 days.

(21) Appl. No.: 13/322,553

(22) PCT Filed: May 25, 2010

(86) PCT No.: PCT/CN2010/073241
§ 371 (c)(1),
(2), (4) Date: Oct. 8, 2012

(87) PCT Pub. No.: WO2010/135989
PCT Pub. Date: Dec. 2, 2010

(65) Prior Publication Data
US 2013/0121838 A1    May 16, 2013

(30) Foreign Application Priority Data

May 27, 2009    (CN) .......................... 2009 1 0027309

(51) Int. Cl.
*F01D 5/02*    (2006.01)
*F03B 3/12*    (2006.01)

(52) U.S. Cl.
CPC . *F01D 5/02* (2013.01); *F03B 3/121* (2013.01); *F03B 3/125* (2013.01); *F05B 2250/71* (2013.01); *Y02E 10/223* (2013.01); *Y02E 10/28* (2013.01)

(58) Field of Classification Search
CPC ................ F03B 3/00; F03B 3/02; F03B 3/12; F03B 3/121; F03B 3/125; F01D 1/06; F01D 1/22; F01D 5/03; F01D 5/043
See application file for complete search history.

(56) References Cited

U.S. PATENT DOCUMENTS

| 963,378 | A | * | 7/1910 | Lorenz | ...................... 416/186 R |
| 3,874,819 | A | * | 4/1975 | Tamura et al. | ............ 416/186 R |
| 2005/0249594 | A1 | * | 11/2005 | Chandraker | .................. 416/115 |
| 2007/0140852 | A1 | * | 6/2007 | Nakamura et al. | ............ 416/179 |

FOREIGN PATENT DOCUMENTS

WO    PCT/CN2010/073241    9/2010

* cited by examiner

*Primary Examiner* — Edward Look
*Assistant Examiner* — Christopher J Hargitt
(74) *Attorney, Agent, or Firm* — Global IP Services; Tianhua Gu

(57) ABSTRACT

The invention relates to a runner for a direct-connected low-speed small mixed flow type water turbine applied in a hydrodynamic energy-saving cooling tower, which comprises an upper crown (1), a lower ring (3) and curved surface blades (2) mounted between the upper crown (1) and the lower ring (3), and is characterized in that the ratio of the height h of water inlet edge (4) of each blade (2) to the diameter D1 corresponding to the water inlet edge (4) is 0.18-0.22, the ratio of the overall height H of the blades (2) to the diameter D1 is 0.35-0.42, the ratio of the diameter D2 corresponding to the intersection point A of each water outlet edge (4) and the lower ring (3) to the diameter D1 is 0.4-0.6, the ratio of the diameter D3 corresponding to the intersection point B of each water outlet edge (4) and the upper crown to the diameter D1 is 0.3-0.45, the ratio of the diameter D4 in the position of a water drain round platform on the upper crown (1) to the diameter D1 is 0.1-0.2, and the relationship between the diameter D1 and the rotational speed of cooling fan blades is $D1 = n11 \times \sqrt{H}/n$. The invention has the advantages of simple structure, convenience in design and mounting and high energy conversion efficiency.

2 Claims, 2 Drawing Sheets

RUNNER FOR DIRECT-CONNECTED LOW-SPEED SMALL MIXED FLOW TYPE WATER TURBINE APPLIED IN HYDRODYNAMIC ENERGY-SAVING COOLING TOWER

CROSS REFERENCE TO RELATED PATENT APPLICATION

The present application is the US national stage of PCT/CN2010/073241 filed on May 25, 2010 which claims the priority of the Chinese patent application No. 200910027309.9 filed on May 27, 2009, which application is incorporated herein by reference.

TECHNICAL FIELD

The invention relates to a cooling tower, in particular to a runner of a water turbine for driving the cooling tower, more specifically, the invention discloses a runner for a direct-connected low-speed small mixed flow type water turbine applied in a hydrodynamic energy-saving cooling tower, which is not provided with a speed reduction box and can enable the output rotational speed of the water turbine to be the rated value of the rotational speed of a fan through reasonable design of the runner of the water turbine so as to eliminate the speed reduction box used by a traditional reaction water turbine.

BACKGROUND OF THE INVENTION

As we all know, in order to realize the energy-saving purpose, an existing air-conditioning cooling tower has started using a water turbine to drive a cooling fan, thereby fully utilizing energy of circulating water flow of the cooling tower to transform the energy to driving force of the water turbine; and the water turbine is used for transforming water energy to rotation mechanical energy for driving the cooling fan, thereby eliminating a traditional high-power cooling motor and realizing very significant energy-saving effect.

Presently, a circulating water abundant water head of the industrial air-conditioning cooling tower in China is 4 m-15 m, and the pressure water head of 0.5 m-1 m is required in the position for distributing water pipes, so that the water turbine for recovering the part of the circulating water abundant water head works in an environment with back pressure; but the rotational speed of the fan of the cooing tower is lower, in order to realize direct connection with the fan of the cooling tower, the low-speed mixed flow type water turbine must be selected; however, in the current spectrum of the water turbines in China, the low-speed mixed flow type water turbine which can meet the working environment and be directly connected with the cooling fan is still absent, the driving mode of connecting the ordinary mixed flow type water turbine with the fan of the cooling tower through a speed reducer needs to be adopted, as the working conditions of a speed reduction box are poorer, not only the noise is great and the service life is short, but also the manufacturing cost is correspondingly improved. Therefore, the mixed flow type water turbine which can meet the low unit rotational speed under the working environment and be directly connected with the fan of the cooling tower is designed, thereby having great practical significance.

SUMMARY OF THE INVENTION

The invention aims at designing a runner for a direct-connected low-speed small mixed flow type water turbine applied in a hydrodynamic energy-saving cooling tower against the problems that an output shaft of the existing water turbine of the cooling tower can only drive fan blades through a speed reduction box, the noise is large, fault is easy to occur and the manufacturing cost is high, thereby laying a foundation for finally eliminating a gear speed reduction transmission mechanism.

The technical scheme of the invention is as follows:

A runner for a direct-connected low-speed small mixed flow type water turbine applied in a hydrodynamic energy-saving cooling tower comprises an upper crown 1, a lower ring 3 and curved surface blades 2 mounted between the upper crown 1 and the lower ring 3, wherein the water inlet edge 4 is arranged at one end of each curved surface blade 2, each water inlet edge 4 is the high pressure side of the runner and is also the radial inflow side of water flow, the water outlet edge 5 is arranged at the other end of each curved surface blade 2, and each water outlet edge is the low pressure side of the runner and is also the axial outflow side of the water flow; connection points between the water outlet edges 5 and the lower ring 2 are A, the connection points between the water outlet edges 5 and the upper crown are B, and the runner is characterized in that the ratio of the height h of the water inlet edge 4 of each blade 2 to the diameter D1 corresponding to the water inlet edge 4 is 0.18-0.22, the ratio of the overall height H of the blades 2 to the diameter D1 is 0.35-0.42, the ratio of the diameter D2 corresponding to the intersection point A of each water outlet edge 4 and the lower ring 3 to the diameter D1 is 0.4-0.6, the ratio of the diameter D3 corresponding to the intersection point B of each water outlet edge 4 and the upper crown to the diameter D1 is 0.3-0.45, the ratio of the diameter D4 in the position of a water drain round platform on the upper crown 1 to the diameter D1 is 0.1-0.2, and the relationship between the diameter D1 and the rotational speed of cooling fan blades is $D1 = n11 \times \sqrt{H}/n$, wherein n11 is a constant number and called as unit rotational speed, the value range is 28-42, n is the rated rotational speed of the cooling fan blades, and H is the inlet water pressure (water column is taken as unit: m).

The number of the curved surface blades 2 is 16-20, and the ratio of the minimal thickness to the maximal thickness of wing shapes of the blades is 0.28-0.34.

The invention has the following benefits:

The invention can lay a foundation for finally eliminating the speed reduction box for the water turbine for the cooling tower, by utilizing the runner designed by the invention, the using requirements can be fully met, and experiments prove that the output rotational speed of the water turbine equipped with the runner can fully meet the using requirements, and the pulsation range of the rotational speed is smaller.

The structure is simple, and the mounting and the use are very convenient.

Against the characteristics of the water turbine for the cooling tower, the unit rotational speed n11 is creatively reduced from the level of not less than 80 during actual application of the traditional reaction water turbine to 28-42; simultaneously, a curve equation of key elements, namely guide vanes, which can affect the efficiency of the water turbine, is determined according to the unit rotational speed, the relationship between the size of the runner and the size D1 of the water inlet edges of the blades is given out through a lot of calculation and experiments, and the relationship between the D1 and the rotational speed of a cooling fan is simultaneously given out, thereby providing a fast and convenient way for reasonably designing the runner.

Experiments prove that as long as the unit rotational speed is 28-42, the determined size D1 of the water inlet edges of the blades and the determined size of the runner can maintain the overall efficiency of the water turbine at about 86%, when the unit rotational speed is more than 42 or less than 28, the efficiency is in linear sharp decline.

DETAILED DESCRIPTION OF THE INVENTION

Figure 1:
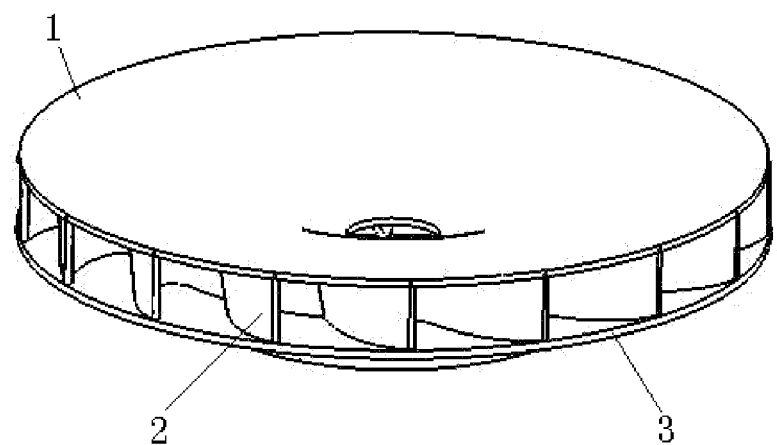
FIG. 1 is a schematic diagram of stereostructure of runner of the invention.
Figure 2:
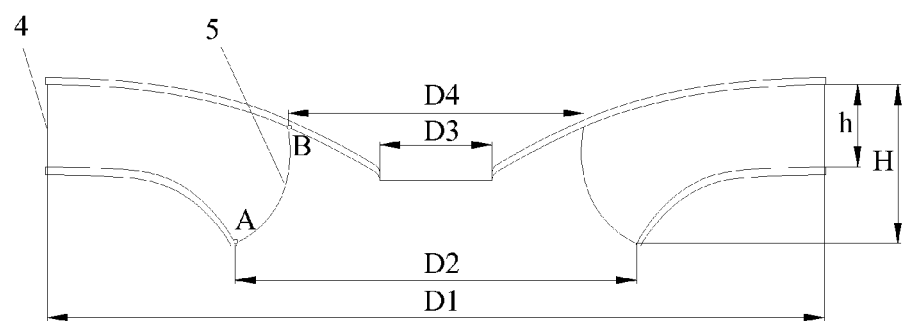
FIG. 2 is a size schematic diagram of all parts of the runner of the invention.
Figure 3:
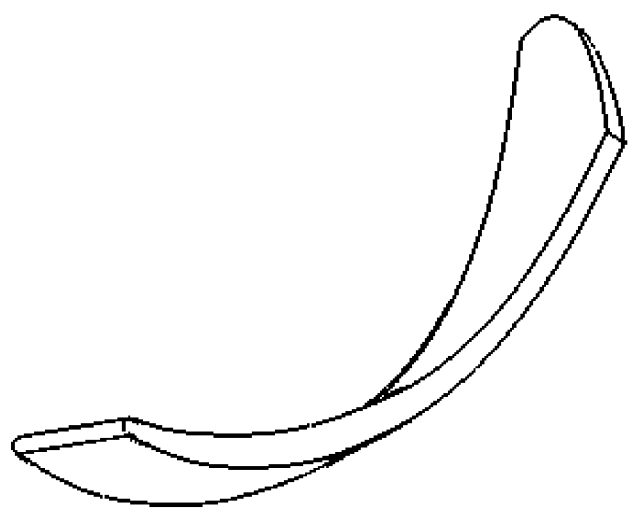
FIG. 3 is a schematic diagram of stereostructure of curved surface blade of the invention.
Figure 4:
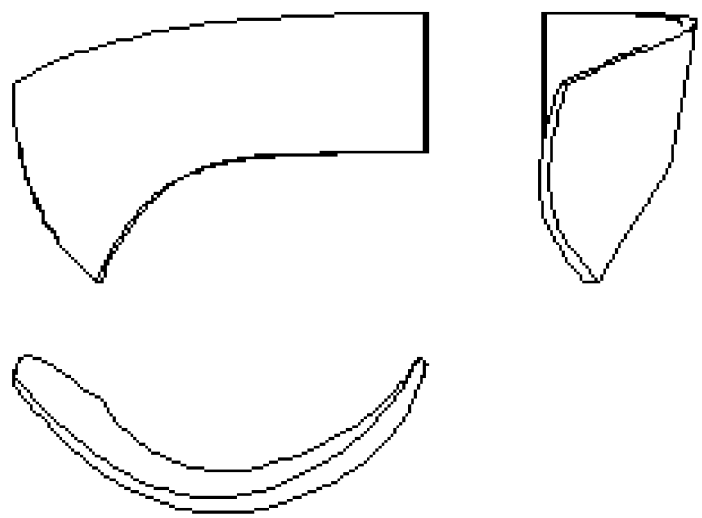
FIG. 4 is a three-view projection drawing of curved surface blade of the invention.

In combination of the figures and the embodiment, the invention is further described as follows. As shown in FIG. 2, a runner for a direct-connected low-speed small mixed flow type water turbine applied in a hydrodynamic energy-saving cooling tower comprises an upper crown 1, a lower ring 3 and 16-20 curved surface blades 2 mounted between the upper crown 1 and the lower ring 3, as shown in FIG. 1, the curved surface blades 2 are in wing-shaped structures, as shown in FIG. 3 and FIG. 4, the ratio of the minimal thickness to the maximal thickness of the wing shapes of the blades is 0.28-0.34, the water inlet edge 4 is arranged at one end of each curved surface blade 2, each water inlet edge 4 is the high pressure side of the runner and is also the radial inflow side of water flow, the water outlet edge 5 is arranged at the other end of each curved surface blade 2, and each water outlet edge is the low pressure side of the runner and is also the axial outflow side of the water flow; connection points between the water outlet edges 5 and the lower ring 2 are A, the connection points between the water outlet edges 5 and the upper crown are B, the ratio of the minimal thickness to the maximal thickness of the wing shapes of the curved surface blades is 0.28-0.34, the relationship between the size of the curved surface blades 2 and the sizes of the related parts of the whole runner is as follows: the ratio of the height h of each water inlet edge 4 to the diameter D1 corresponding to the water inlet edge 4 is 0.18-0.22, the ratio of the overall height H of the blades 2 to the diameter D1 is 0.35-0.42, the ratio of the diameter D2 corresponding to the intersection point A of each water outlet edge 4 and the lower ring 3 to the diameter D1 is 0.4-0.6, the ratio of the diameter D3 corresponding to the intersection point B of each water outlet edge 4 and the upper crown to the diameter D1 is 0.3-0.45, and the ratio of the diameter D4 in the position of a water drain round platform on the upper crown 1 to the diameter D1 is 0.1-0.2, as shown in FIG. 2. The relationship between the diameter D1 of each water inlet edge and the rotational speed of cooling fan blades is $D1 = n_{11} \times \sqrt{H}/n$, wherein $n_{11}$ is a constant number and called as unit rotational speed, the value range is 28-42, n is the rated rotational speed of the cooling fan blades, and H is the inlet water pressure (water column is taken as unit: m).

When in specific implementation, once the rotational speed of the fan blades of the cooling tower is determined, the value of $n_{11}$ is further selected according to a using environment, generally speaking, the selected value in the South is higher, the selected value in the North is lower, under most of the situations, the appropriate selected value is 35, then the value of D1 can be determined by the inlet water pressure H, and the sizes of all the parts, namely the curved surface blades, the upper crown and the lower ring are finally determined according to the value of D1, thereby getting the runner meeting the requirement on the rated rotational speed.

Several specific calculation examples are described as follows:

EXAMPLE 1

Assume that $n_{11}$ is 35, the inlet water pressure H is 13 m and the rated rotational speed n of fan blades is 136 r/min, then D1 is 0.928 m, and one curved surface blade in the shape as shown in FIGS. 3 and 4 is designed. The actually measured rotational speed of the mounted fan blades is 137 r/min, which is in line with the design requirement.

EXAMPLE 2

Assume that $n_{11}$ is 30, the inlet water pressure H is 15 m and the rated rotational speed n of fan blades is 140 r/min, then D1 is 0.830 m, and one curved surface blade in the shape as shown in FIGS. 3 and 4 is designed. The actually measured rotational speed of the mounted fan blades is 138 r/min, which is in line with the design requirement.

EXAMPLE 3

Assume that $n_{11}$ is 40, the inlet water pressure H is 15 m and the rated rotational speed n of fan blades is 130 r/min, then D1 is 1.192 m, and one curved surface blade in the shape as shown in FIGS. 3 and 4 is designed. The actually measured rotational speed of the mounted fan blades is 131 r/min, which is in line with the design requirement.

EXAMPLE 4

Assume that $n_{11}$ is 28, the inlet water pressure H is 13 m and the rated rotational speed n of fan blades is 136 r/min, then D1 is 0.742 m, and one curved surface blade in the shape as shown in FIGS. 3 and 4 is designed. The actually measured rotational speed of the mounted fan blades is 130 r/min, which is in line with the design requirement.

EXAMPLE 5

Assume that $n_{11}$ is 42, the inlet water pressure H is 10 m and the rated rotational speed n of fan blades is 140 r/min, then D1 is 0.949 m, and one curved surface blade in the shape as shown in FIGS. 3 and 4 is designed. The actually measured rotational speed of the mounted fan blades is 145 r/min, which is in line with the design requirement.

EXAMPLE 6

Assume that $n_{11}$ is 27, the inlet water pressure H is 13 m and the rated rotational speed n of fan blades is 136 r/min, then D1 is 0.712 m, and one curved surface blade in the shape as shown in FIGS. 3 and 4 is designed. The actually measured rotational speed of the mounted fan blades is 110 r/min, which is not in line with the design requirement.

EXAMPLE 7

Assume that $n_{11}$ is 43, the inlet water pressure H is 10 m and the rated rotational speed n of fan blades is 140 r/min, then D1 is 0.969 m, and one curved surface blade in the shape as shown in FIGS. 3 and 4 is designed. The actually measured rotational speed of the mounted fan blades is 120 r/min, which is not in line with the design requirement.

For those skilled in the art, a wood former can be obtained very conveniently by referring to the relationship among all parameters between the blades and the runner, as well as the relationship between the diameter of the water inlet edge of each blade and the unit rotational speed, and between the water head and the rotational speed of the fan blades, and then an ideal conversion structure can be obtained by design after finishing the wood former directly or slightly.

The non-involved parts are the same with the prior art or can be realized by adopting the prior art.

What is claimed is:

1. A runner for a direct-connected low-speed small mixed flow type water turbine applied in a hydrodynamic energy-saving cooling tower, comprising an upper crown (1), a lower ring (3) and curved surface blades (2) mounted between the upper crown (1) and the lower ring (3), wherein the water inlet edge (4) is arranged at one end of each curved surface blade (2), each water inlet edge (4) is the high pressure side of the runner and is also the radial inflow side of water flow, the water outlet edge (5) is arranged at the other end of each curved surface blade (2), and each water outlet edge is the low pressure side of the runner and is also the axial outflow side of the water flow; connection points between the water outlet edges (5) and the lower ring (3) are A, the connection points between the water outlet edges (5) and the upper crown are B, and the runner is characterized in that the ratio of the height h of the water inlet edge (4) of each blade (2) to the diameter D1 corresponding to the water inlet edge (4) is 0.18-0.22, the ratio of the overall height H of the blades (2) to the diameter D1 is 0.35-0.42, the ratio of the diameter D2 corresponding to the intersection point A of each water outlet edge (5) and the lower ring (3) to the diameter D1 is 0.4-0.6, the ratio of the diameter D3 corresponding to the intersection point B of each water outlet edge (5) and the upper crown to the diameter D1 is 0.3-0.45, the ratio of the diameter D4 in the position of a water drain round platform on the upper crown (1) to the diameter D1 is 0.1-0.2, and the relationship between the diameter D1 and the rotational speed of cooling fan blades is $D1=n11 \times \sqrt{H}/n$, wherein D1 is the diameter corresponding to each water inlet edge (4), the unit of the diameter D1 is m, n11 is a constant number and called as unit rotational speed, the value range is 28-42, n is the rated rotational speed of the cooling fan blades, the unit of the rated rotational speed n is r/min, H is the inlet water pressure, and the unit of water column is m water column.

2. The runner according to claim 1, characterized in that the number of the curved surface blades (2) is 16-20, and the ratio of the minimal thickness to the maximal thickness of wing shapes of the blades is 0.28-0.34.

\* \* \* \* \*